US010841314B2

(12) United States Patent
Kumaran et al.

(10) Patent No.: US 10,841,314 B2
(45) Date of Patent: Nov. 17, 2020

(54) IDENTIFYING AND BLACKLISTING PROBLEM CLIENTS USING MACHINE LEARNING IN WIRELESS NETWORKS

(71) Applicant: Cisco Technology, Inc., San Jose, CA (US)

(72) Inventors: Vikram Kumaran, Cary, NC (US); Jean-Philippe Vasseur, Saint Martin D'uriage (FR); Santosh Ghanshyam Pandey, Fremont, CA (US); Federico Lovison, Barcelona (ES)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 15/947,958

(22) Filed: Apr. 9, 2018

(65) Prior Publication Data
US 2019/0312876 A1 Oct. 10, 2019

(51) Int. Cl.
| | |
|---|---|
| *H04L 29/06* | (2006.01) |
| *H04W 76/18* | (2018.01) |
| *G06N 20/00* | (2019.01) |
| *H04W 8/18* | (2009.01) |
| *H04W 24/08* | (2009.01) |
| *H04W 48/02* | (2009.01) |

(Continued)

(52) U.S. Cl.
CPC .......... *H04L 63/102* (2013.01); *G06N 20/00* (2019.01); *H04L 41/0681* (2013.01); *H04L 41/16* (2013.01); *H04L 41/507* (2013.01); *H04L 41/5064* (2013.01); *H04L 43/0823* (2013.01); *H04W 8/18* (2013.01); *H04W 24/08* (2013.01); *H04W 48/02* (2013.01); *H04W 76/18* (2018.02)

(58) Field of Classification Search
CPC ...... H04L 63/102; H04W 8/18; H04W 76/18; H04W 24/08; H04W 48/02; G06N 20/00
See application file for complete search history.

(56) References Cited

U.S. PATENT DOCUMENTS

| | | | |
|---|---|---|---|
| 7,545,748 B1 * | 6/2009 | Riddle | .................... H04L 43/08 370/230 |
| 9,483,338 B2 | 11/2016 | Bhalla et al. | |
| 9,753,796 B2 | 9/2017 | Mahaffey et al. | |

(Continued)

FOREIGN PATENT DOCUMENTS

WO  WO2017/003780 A1  1/2017

OTHER PUBLICATIONS

European Search Report dated Jun. 17, 2019 in connection with European Application No. 19167170.

*Primary Examiner* — Baotran N To
(74) *Attorney, Agent, or Firm* — Behmke Innovation Group LLC; Kenneth J. Heywood; Jonathon P. Western

(57) ABSTRACT

In one embodiment, a network assurance service that monitors a wireless network receives data regarding connection failures of a wireless client of the wireless network. The network assurance service forms a behavioral profile for the wireless client based on the received data regarding the connection failures of the wireless client. The network assurance service uses machine learning to determine whether the behavioral profile of the wireless client is an outlier in relation to behavioral profiles of other wireless clients of the wireless network. The network assurance service causes performance of a mitigation action with respect to the wireless client, when the wireless client is determined to be an outlier.

20 Claims, 13 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 2012/0036557 A1* | 2/2012 | Li | H04L 63/061 |
| | | | 726/3 |
| 2016/0359719 A1 | 12/2016 | Travostino | |
| 2016/0373306 A1 | 12/2016 | Saha et al. | |
| 2017/0214702 A1 | 7/2017 | Moscovici | |
| 2017/0230846 A1 | 8/2017 | Wang | |
| 2017/0272317 A1* | 9/2017 | Singla | H04L 41/0806 |
| 2017/0279847 A1 | 9/2017 | Dasgupta | |
| 2018/0013783 A1 | 1/2018 | Anachi | |

* cited by examiner

IDENTIFYING AND BLACKLISTING PROBLEM CLIENTS USING MACHINE LEARNING IN WIRELESS NETWORKS

TECHNICAL FIELD

The present disclosure relates generally to computer networks, and, more particularly, to using machine learning to identify and blacklist problem clients in wireless networks.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
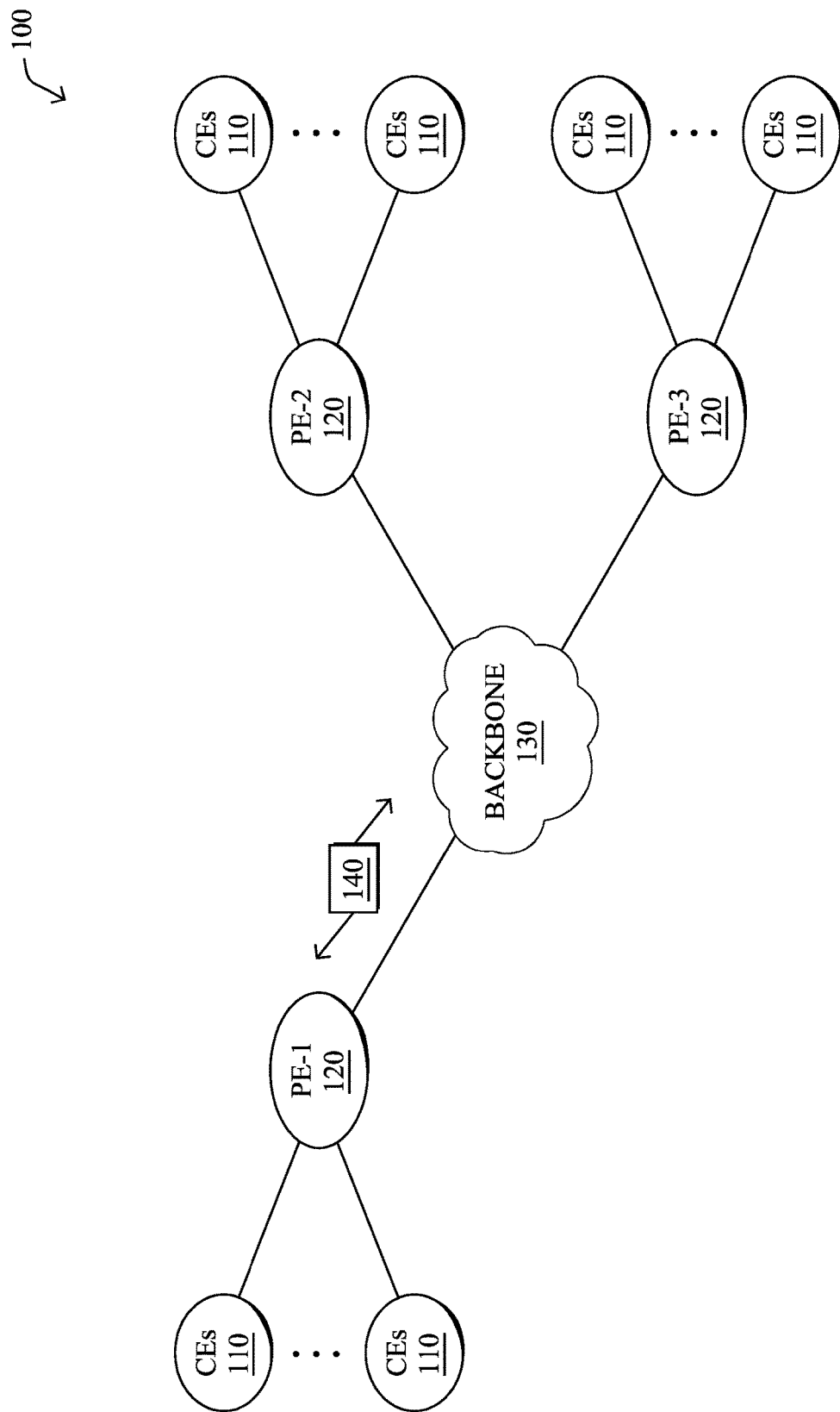
FIGS. 1A-1B illustrate an example communication network.

According to one or more embodiments of the disclosure, a network assurance service that monitors a wireless network receives data regarding connection failures of a wireless client of the wireless network. The network assurance service forms a behavioral profile for the wireless client based on the received data regarding the connection failures of the wireless client. The network assurance service uses machine learning to determine whether the behavioral profile of the wireless client is an outlier in relation to behavioral profiles of other wireless clients of the wireless network. The network assurance service causes performance of a mitigation action with respect to the wireless client, when the wireless client is determined to be an outlier.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
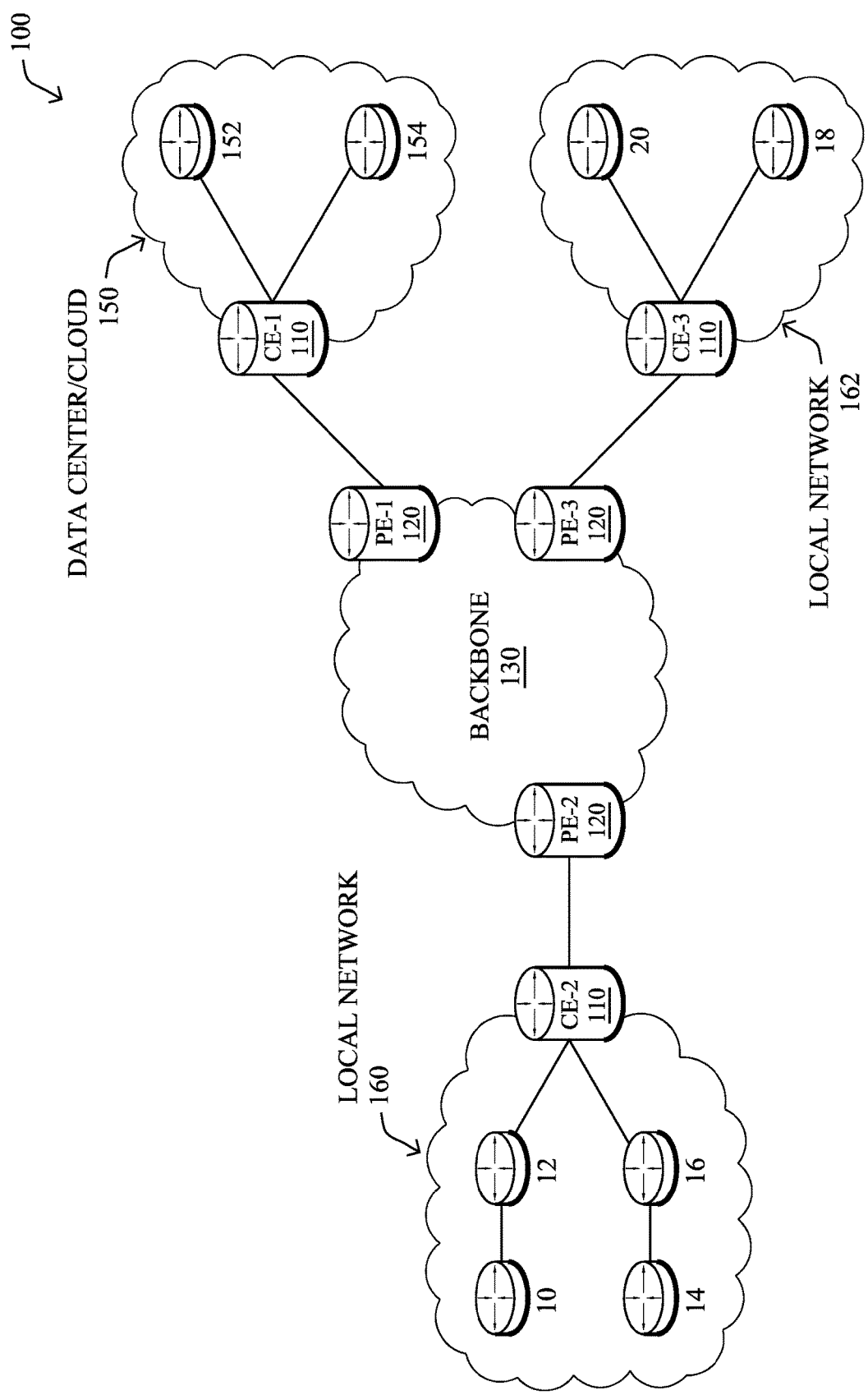

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
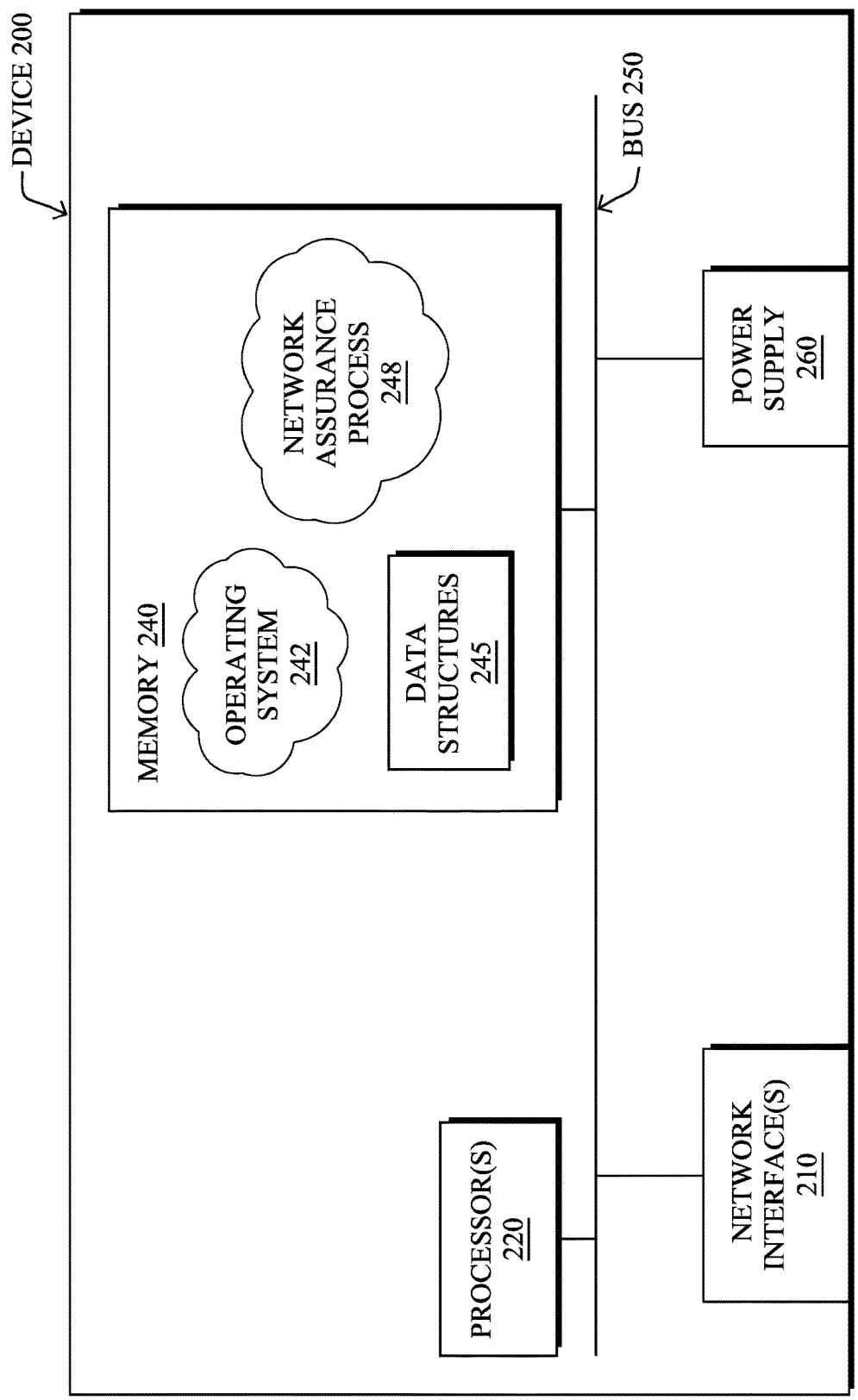
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
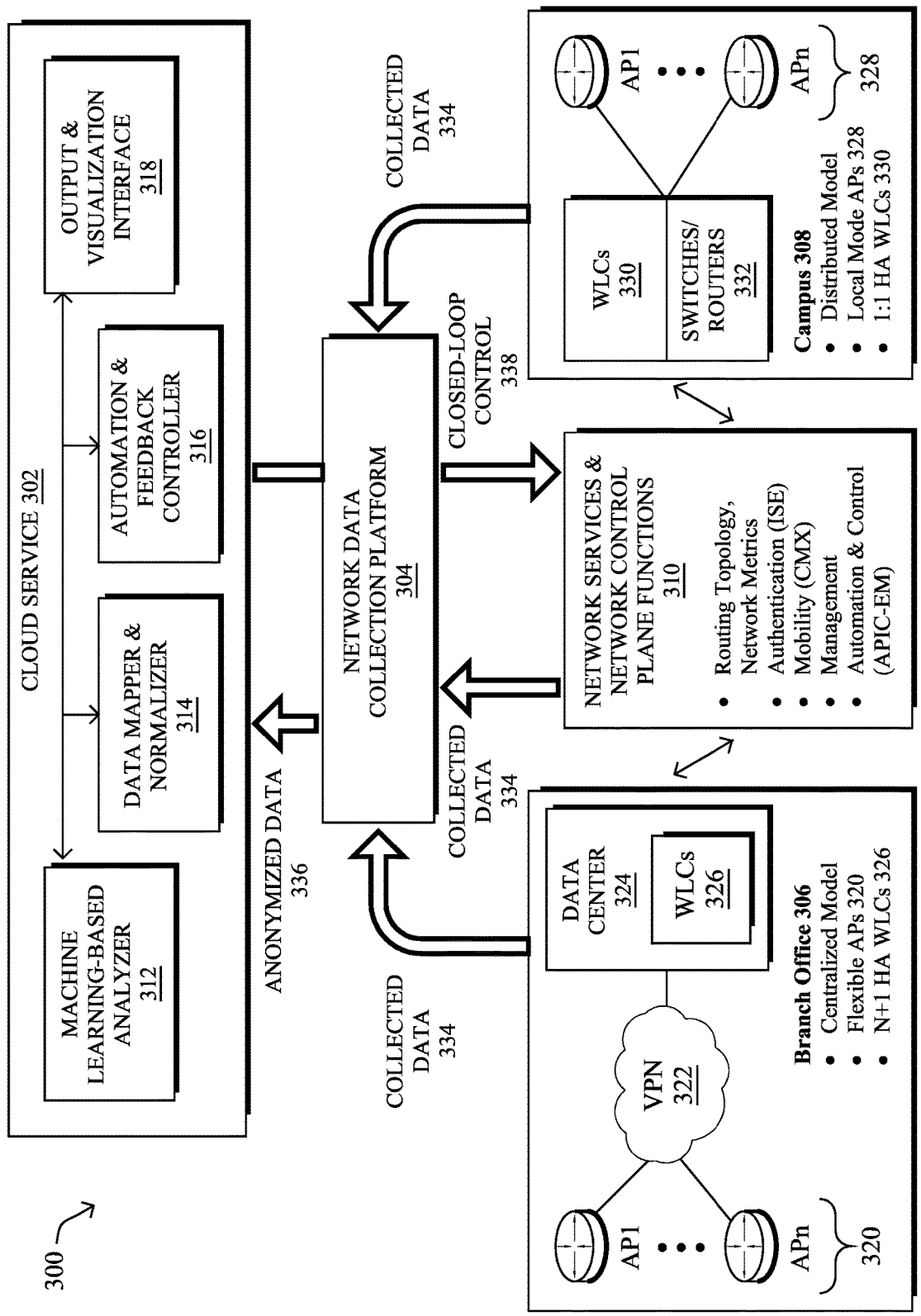
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, Wi-Fi and other forms of wireless networks are complex, distributed systems where multiple network devices and protocols interact with each other. Most common deployments provide service to hundreds of thousands of unique clients. While most clients typically connect and use the network without issue, some clients have problems connecting to the network. Of these clients, a certain portion consistently exhibit problems that can result in suboptimal experiences for the rest of the clients in the network. In addition, these problem clients may alter the relevant metrics used by a network assurance system/service to analyze the network performance. For example, a problem client exhibiting association failures may repeatedly attempt to connect to the network and, consequently, greatly increase the number of failures observed by the network assurance system/service.

Identifying and Blacklisting Problem Clients Using Machine Learning in Wireless Networks The techniques herein leverage machine learning to identify wireless clients in a network that exhibit problems (e.g., failing to connect to the network, etc.) that can impact the overall health of the network. For example, problems associated with a given client can be tracked over a period of time (e.g., days, weeks, etc.), as well as across different points in the network (e.g., different locations/APs, etc.), to determine whether the problems exhibited by the client are transitory or persistent. In further aspects, the techniques herein introduce mitigation strategies to help mitigate the impact of these problem clients across the wireless network, such as through dynamic blacklisting of clients.

Specifically, according to one or more embodiments of the disclosure as described in detail below, a network assurance service that monitors a wireless network receives data regarding connection failures of a wireless client of the wireless network. The network assurance service forms a behavioral profile for the wireless client based on the received data regarding the connection failures of the wireless client. The network assurance service uses machine learning to determine whether the behavioral profile of the wireless client is an outlier in relation to behavioral profiles of other wireless clients of the wireless network. The network assurance service causes performance of a mitigation action with respect to the wireless client, when the wireless client is determined to be an outlier.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, as noted, a network assurance system/service using the techniques herein may leverage machine learning to analyze the network data (e.g., JSON files from controllers, Netflow data, etc.) from a monitored network, and provide cognitive insights to the network administrator. In various embodiments, as detailed below, the network assurance service may also assess client behaviors to: (1) identify the clients that have an unusually high failure profile based on statistical data collected from the network and (2) communicate the results back to the network operator and/or take automatic steps to weed out these problem clients from the network. Performing these tasks jointly is an inherently hard problem given the large number of clients in a typical wireless network, with many wireless clients being transient to the network. The techniques introduced herein propose accomplishing both by:
1. Calculating the statistical properties of the wireless clients in the network, distinguish between typical and abnormal behavior.
2. Identifying and reporting on individual clients have demonstrated "bad" behavior on the network.
3. Causing the performance of a mitigation action, such as employing a time-based penalty system to blacklist and weed out offending clients.

The notion of problem clients in a wireless network can be seen from FIGS. 4-8, which illustrate various metrics collected from an actual network during testing.

Figure 4:
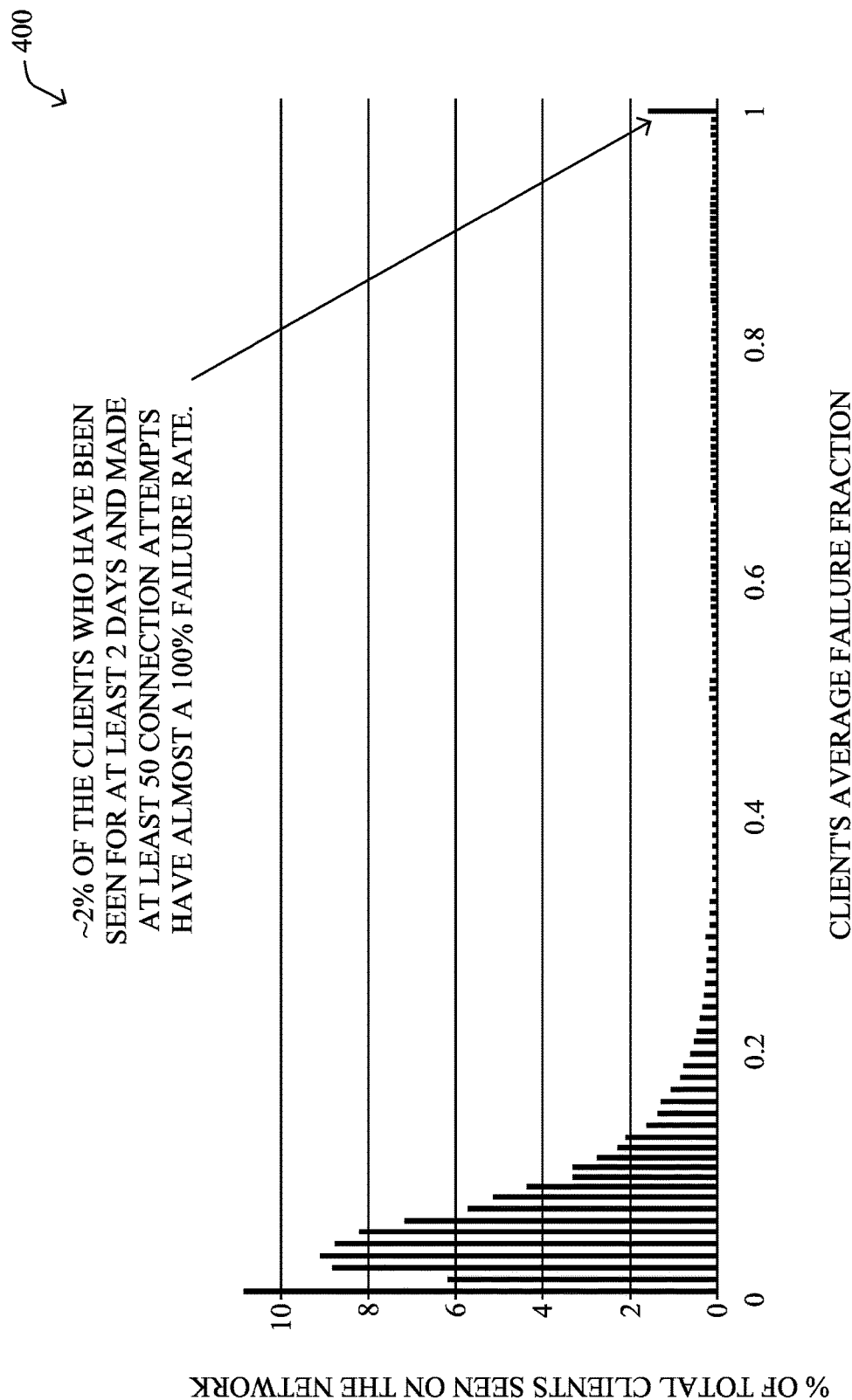
FIG. 4 illustrates an example plot of observed client failures in a wireless network.

FIG. 4 illustrates an example plot 400 of observed client failures in a wireless network. In particular, plot 400 illustrates the distribution of fraction of failed connection attempts by a wireless client in the observed network. From this distribution, it can be seen that approximately 2% of the wireless clients seen by the network for at least two days and made at least fifty connection attempts, exhibit a connection failure rate of almost 100%.

Figure 5:
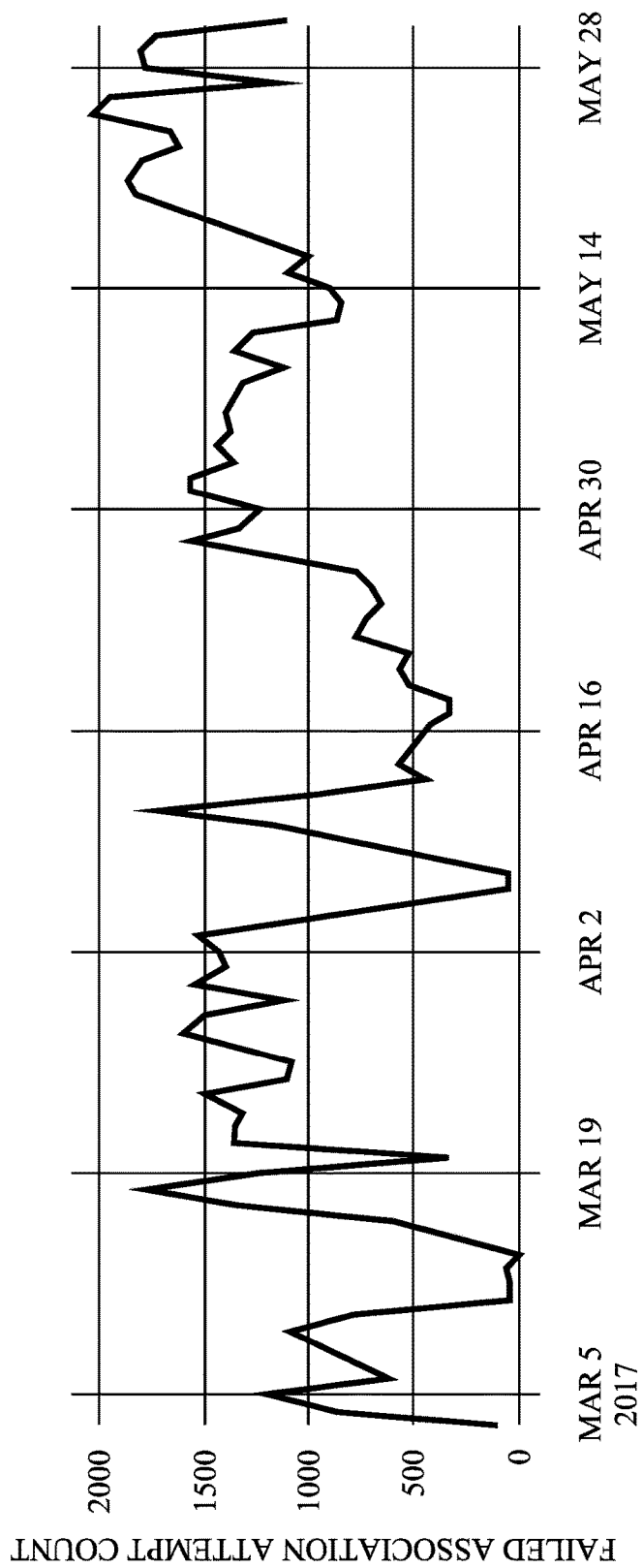
FIG. 5 illustrates an example plot of failed association attempts by wireless clients.

FIG. 5 illustrates an example plot 500 of failed association attempts by wireless clients. As shown, plot 500 illustrates the observed failed association attempt count for the top four worst wireless clients over a time period spanning several months. From this, it can be seen that it takes only a few problematic clients to increase the failed association attempt count, considerably. Such failures increase the resource consumption by the network and could affect the assessment of the network by a network assurance system/service that is monitoring the network.

Figure 6:
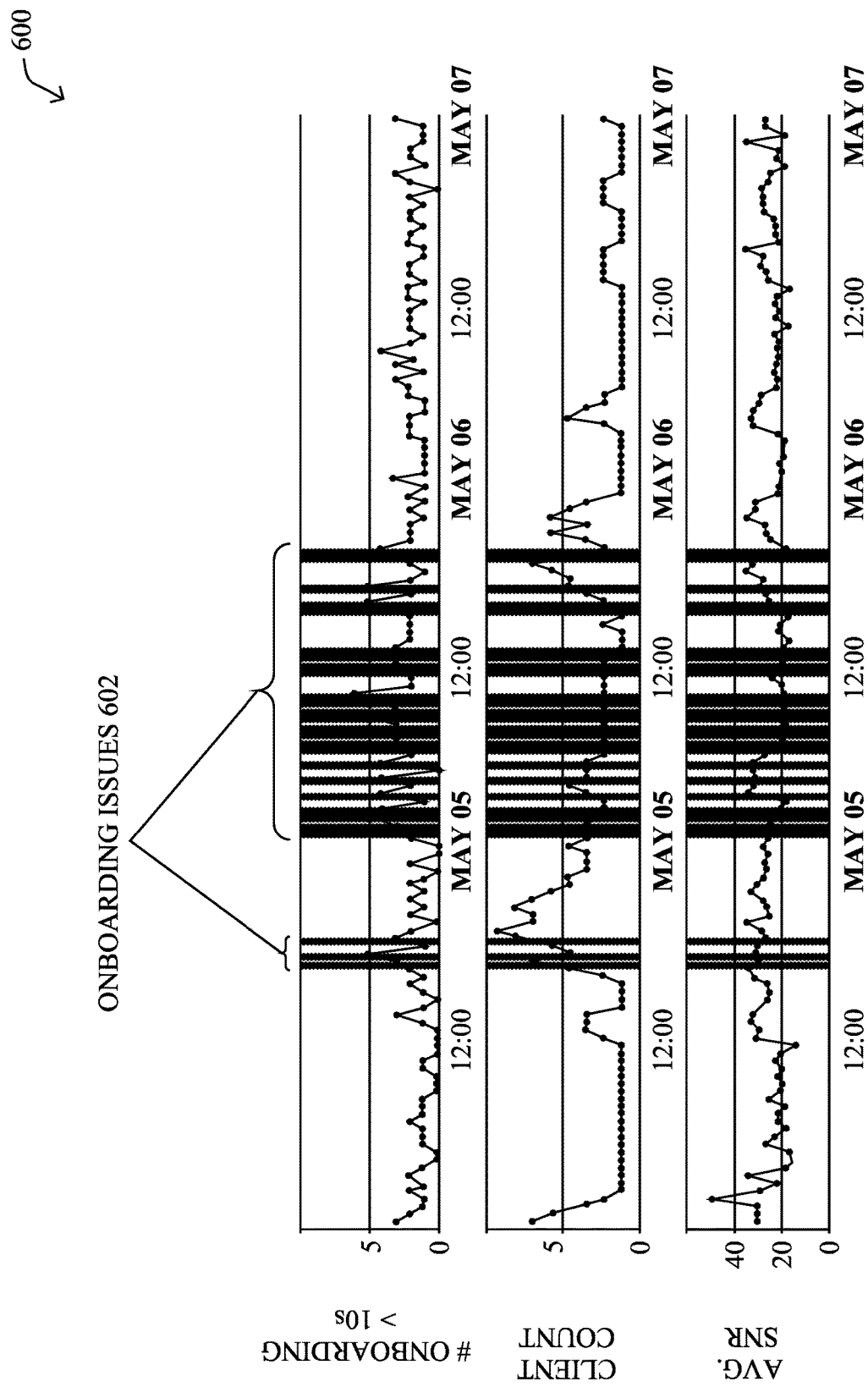
FIG. 6 illustrates an example plot demonstrating client onboarding issues in a wireless network.

FIG. 6 illustrates an example plot 600 demonstrating client onboarding issues in the observed network of the span of several months. In particular, plot 600 illustrates the average signal to noise ratio (SNR), client count, and number of onboarding attempts that took longer than ten seconds. The bands 602 highlight all of the times at which onboarding issues were observed. Some of these issues may be attributable to the number of clients in the network, while others may be attributable to the observed SNR, while others may simply be caused by a small group of problem clients.

Figure 7:
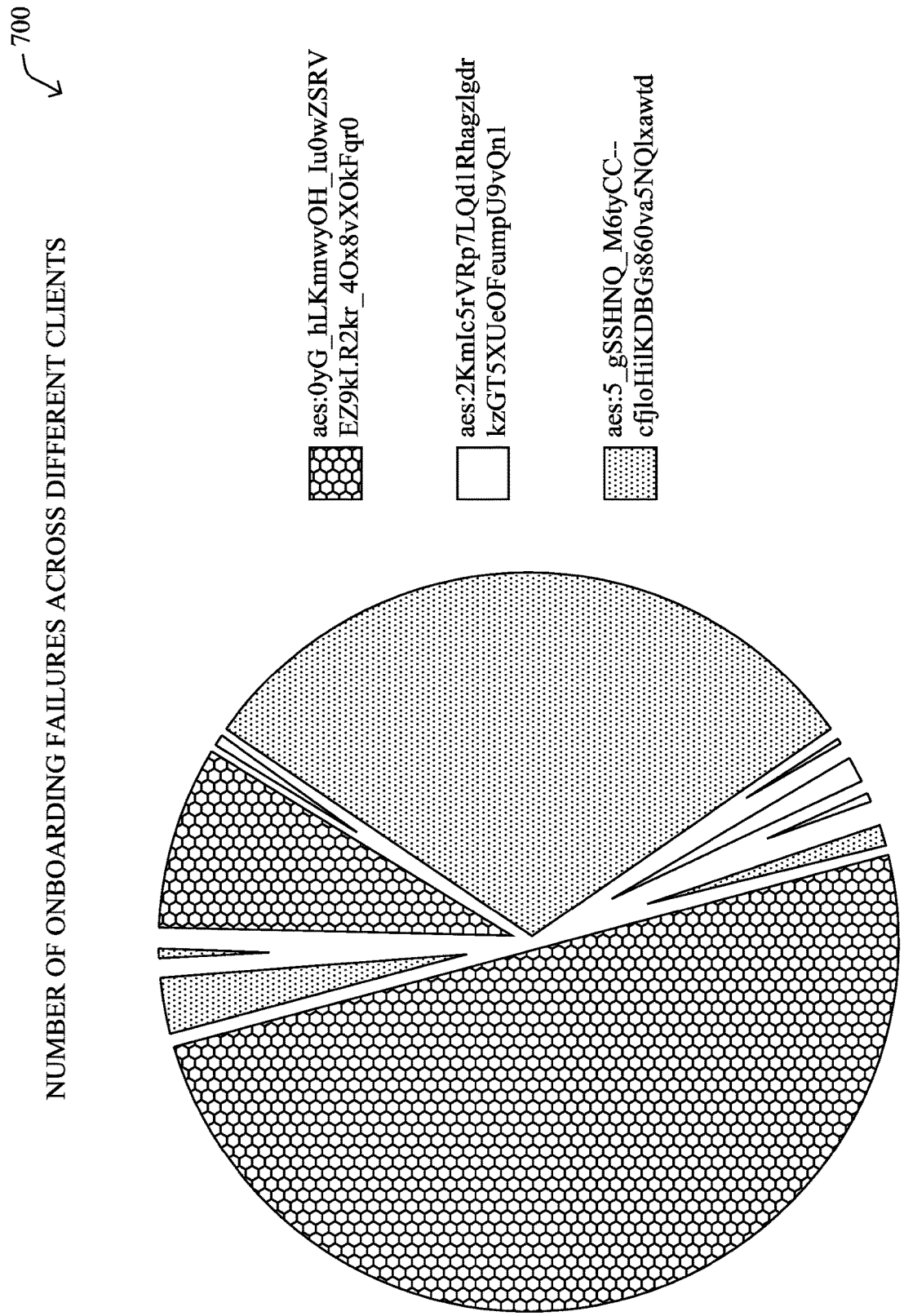
FIG. 7 illustrates an example pie chart of onboarding failures exhibited by different wireless clients.

FIG. 7 illustrates an example pie chart 700 of onboarding failures exhibited by different wireless clients in the observed network. As shown, only a few wireless clients in the network account for the majority of onboarding issues. In the extreme case, a single client was responsible for approximately 50% of the total number of onboarding failures observed in the network.

Figure 8:
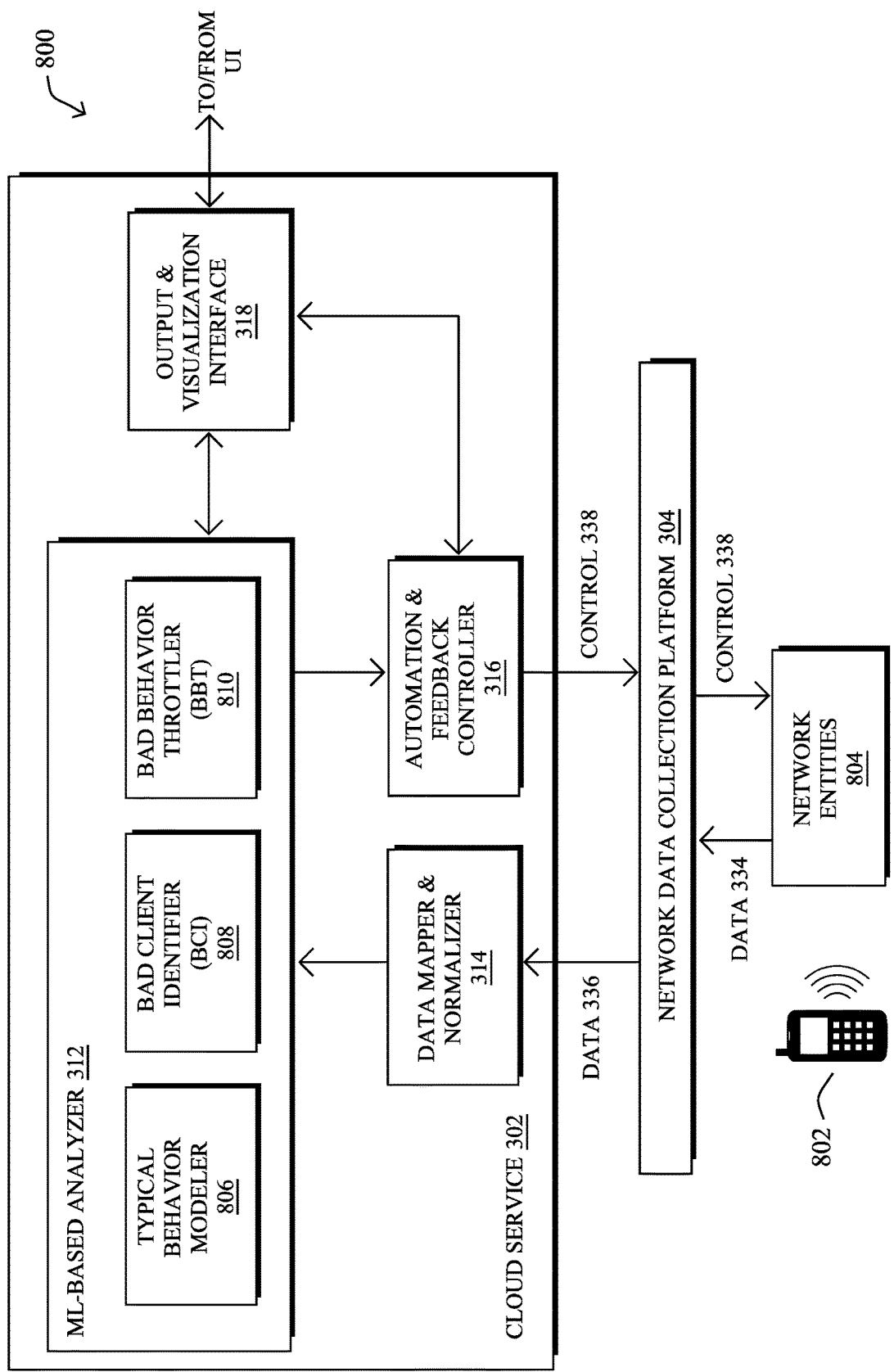
FIG. 8 illustrates an example architecture for identifying and blacklisting problem clients in a wireless network.

FIG. 8 illustrates an example architecture for identifying and blacklisting problem clients in a wireless network, according to various embodiments. At the core of architecture 800 may be the following components: a typical behavior modeler 806, a bad client identifier (BCI) 408, and/or a bad behavior throttler (BBT) 410. In some implementations, the components of architecture 800 may be implemented within a network assurance system, such as system 300 shown in FIG. 3. Accordingly, the components 806-810 of architecture 800 shown may be implemented as part of cloud service 302 (e.g., as part of machine learning-based analyzer 312), as part of network data collection platform 304, and/or on one or more network elements/entities 804 that communicate with one or more client devices 802 within the monitored network itself. Further, these components may be implemented in a distributed manner or implemented as its own stand-alone service, either as part of the local network under observation or as a remote service. In addition, the functionalities of the components of architecture 800 may be combined, omitted, or implemented as part of other processes, as desired.

In various embodiments, typical behavior modeler 406 may be configured to identify the typical behaviors of clients in the network. To do so, typical behavior modeler 406 may receive any or all of the following information from the monitored network (e.g., via network data collection platform 304) regarding a particular wireless client:
The number of days the client was seen by the network—
  In a typical Wi-Fi deployment, for example, most client devices show up for just a few days and a smaller percentage of client devices show up for a longer period of time. In some cases, typical behavior modeler 406 may ignore clients that are rarely seen by the network. For example, only clients that are seen more frequently (e.g., in the top $50^{th}$ percentile of the distribution of days seen) may be considered bad/problematic by the network assurance system and requiring mitigation.
The number and characteristics of the APs to which the client attempted to connect—Note that not all wireless clients in a typical network are mobile. Indeed, some clients are seen at just one location and, hence, connect to only one AP. Other mobile clients, however, may connect to many APs over the course of time. In addition, there are also typically a set of APs that, because of their location, seem to have a high percentage of failed onboarding. A non-mobile client, because of its location, might have a high onboarding failure rate. Based on the typical number of APs seen by a client, the client may fall into one of two categories: 1.)

non-mobile clients that connect predominantly to just one AP and may occasionally connect to other APs and 2.) mobile clients that connect to multiple APs.

The SSID (authentication method) to which the given client is connecting—In a typical Wi-Fi network, the SSID has a one-to-one correlation to the authentication method. Clients authenticating through a web portal usually have a higher rate of connection failure than other authentication mechanisms, such as using a shared key. Also, clients failing a key-based authentication might be misconfigured. Thus, whether the client exhibits continuous failures or intermittent failures is also of interest, to eliminate configuration problems from consideration.

Client device type—This information may also be of interest, since the behavioral profile of a given client is highly driven by its device type.

Based on the received data from the monitored wireless network, typical behavior modeler may form a statistical, behavioral profile for each client to quantify any or all of the following:

The number of days the client is seen on the network, and the percentile that value corresponds to, compared to all client devices seen in the network, over a defined timespan (e.g., in the past few months, days, etc.).

The number of APs to which the client has attempted to connect and the percentile of the client-AP pair counts, by client, seen in the network over the timespan.

The AP to which the client most frequently connects, and the relative frequency of connection with this AP when compared with other APs to which the client connects, along with the onboarding failure percentage for the AP. This helps to determine whether the client is mobile or non-mobile, based on the relative time spent at a single AP (e.g., >95% of the time) compared to all the APs to which the client device has connected.

The onboarding failure rate across all APs for the given client.

The primary SSID (Authentication mechanism) the client device used to connect and the failure percentage. This information allows modeler 406 to determine whether the failures experienced by the client are contiguous or intermittent. As used herein, "intermittent" failures refer to the case in which the client both succeeds and fails at connecting to the network in a single day, and continues to fluctuate between success and failure across multiple days. In one embodiment, modeler 806 may quantify the intermittency of the failures by calculating a contiguous failure ratio as follows:

Contiguous failure ratio=[# days the client successfully connected at least once]/[# days the client was seen by the network]

In various embodiments, bad client identifier (BCI) 808 may be configured to assess the client profiles formed by typical behavior modeler 806 and, in turn, use machine learning to determine whether a given client is a behavioral outlier and, thus, "bad." For example, BCI 808 may use any or all of the following criteria to classify a given wireless client as an outlier:

The client is not a rare client—Generally speaking, clients that are rarely seen by the network (e.g., only one or two days over a span of time) are less of a concern for purposes of identifying problem clients. To make the determination as to whether the client under scrutiny is not a rare client, BCI 808 may determine whether the client falls above a threshold percentile on the distribution of number of days seen on the network. For example, the client may be eligible for classification as a problematic outlier if the client is in a percentile greater than the $50^{th}$ in the distribution of number of days seen by the network (e.g., the client is seen by the network on more days than the average client).

The client uses secret keys for authentication—Another factor that BCI 808 may consider is the mode of authentication used by the client. For example, in some embodiments, BCI 808 may only classify a client as a problematic outlier if the primary mode of connection of the client uses a secret key and not web based authentication.

The client exhibits intermittent connection failures—As noted above, clients that exhibit continual failures may be identified and otherwise ignored, for purposes of identifying problem clients. Notably, BCI 808 may only classify a client as a problematic outlier if it has failed intermittently, rather than contiguously as described above. In one embodiment, BCI 808 may make this determination using the contiguous-fail-ratio in the behavioral profile of the device (e.g., if the ratio is >0.01).

If the client under scrutiny by BCI 808 satisfies any or all of the above criteria, in various embodiments, BCI 808 may then determine whether the failures associated with the client are a statistical outlier. To do so, BCI 808 may compare the failure rate of the client vis-à-vis the overall failure rate for the one or more APs to which the client attempted connections. Notably, in the case of a non-mobile client, the client may connect predominantly to a single AP (e.g., >75% of the time). If the connection failure rate of the client for this AP differs by a statistically significant amount from the overall failure rate for the AP, BCI 808 may classify the client as a problematic outlier. For example, if the client exhibits a high failure rate (e.g., >$90^{th}$ percentile of the failure rate distribution for all clients) with the AP, or in general, but the overall failure rate of the AP for other clients is low (e.g., <$50^{th}$ percentile of the network failure rate distribution), BCI 808 may deem the client as a problematic outlier. In the case of a mobile client (e.g., the client connects to two or more APs, but its connection time is not skewed to a single AP), BCI 808 may instead look at the aggregate failure metrics for these APs, or across all APs in the network, to determine whether the client is a problematic outlier.

In other words, BCI 808 may determine whether the failures experienced by the client under scrutiny are statistical outliers when compared to the other clients in the network. For example, if the client has a particularly high failure rate (e.g., >$90^{th}$ percentile of the failure rate distribution for all clients), BCI 808 may classify the client as a problematic outlier. In some embodiments, BCI 808 may also filter out clients that have failed 100% of the time, or contiguously rather than intermittently.

Figure 9A:
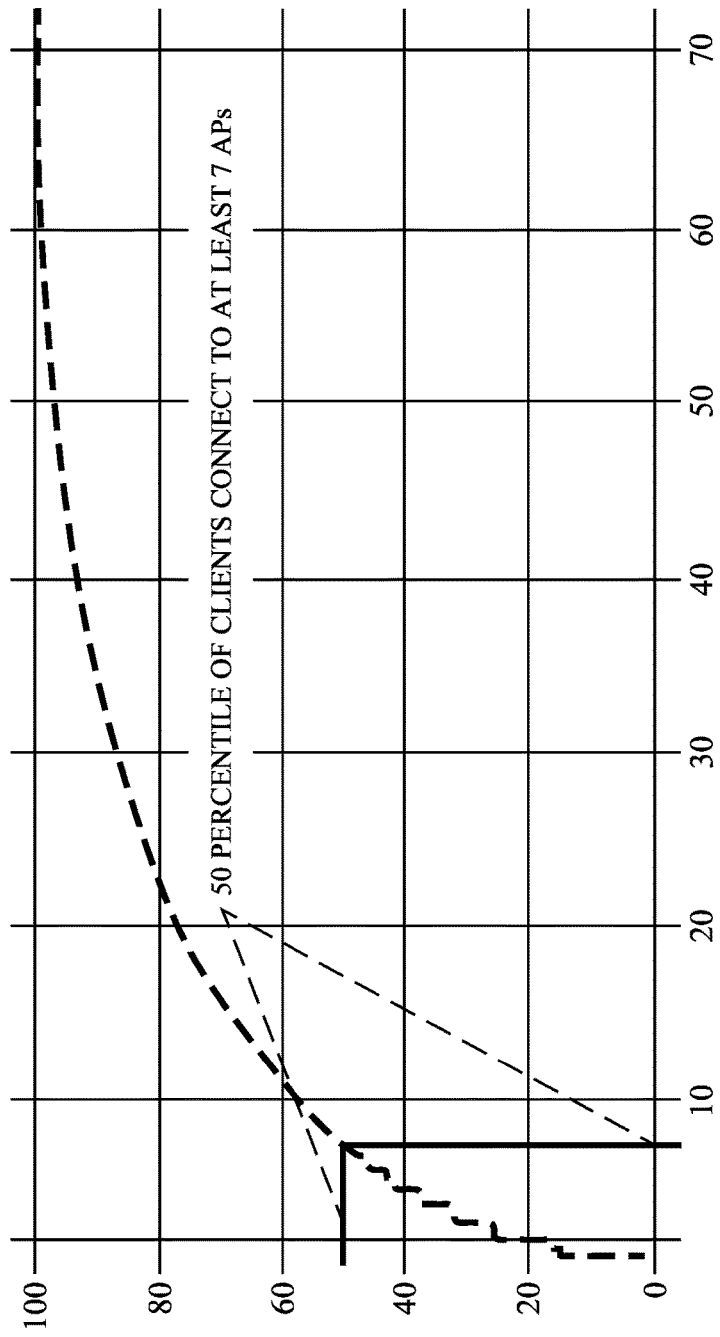
FIGS. 9A-9C illustrate example plots of client statistics observed in a wireless network.
Figure 9B:
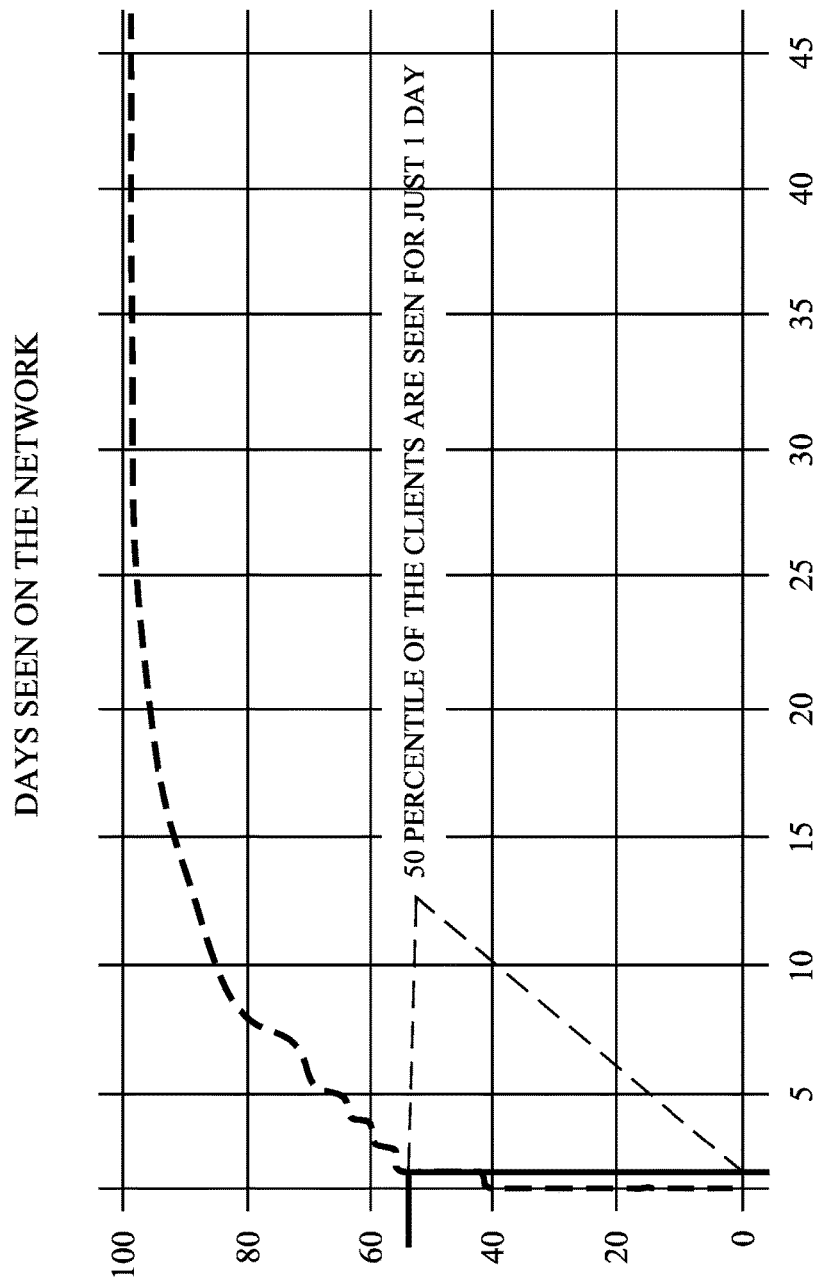
Figure 9C:
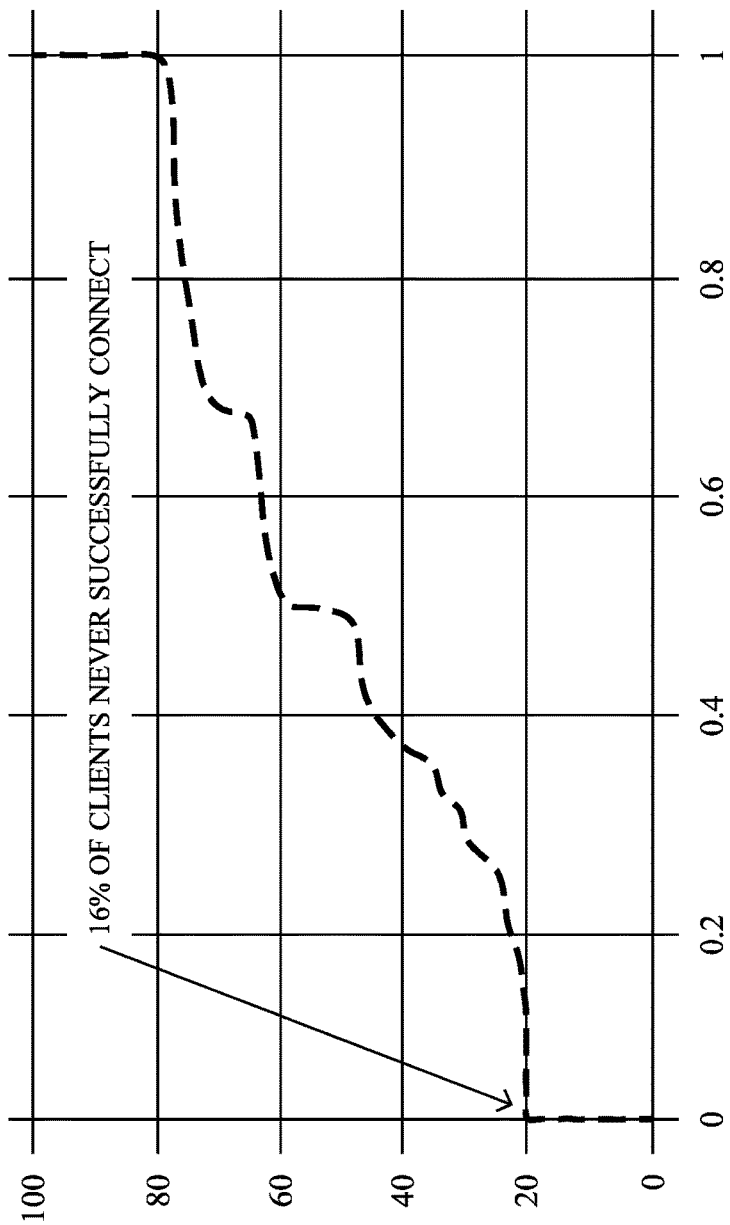

FIGS. 9A-9C illustrate various plots of statistics for clients observed in a real-world wireless network. As shown in plot 900 in FIG. 9A, it can be seen that 50% of the wireless clients in the network attempted associations with more than seven APs in the network. At the $80^{th}$ percentile, a client attempted access to more than twenty APs in the network, with the number of APs increasing sharply for even higher percentiles. The statistics shown in FIGS. 9A-9C are only for authentications using a secret key approach and not for connections made via a web-based authentication mechanism.

In plot 910 in FIG. 9B, it can be seen that a large chunk of the clients, roughly 50%, were seen by the network for only a single day over the span of forty five days. In other words, many of the wireless clients seen by the network were transitory in nature. For example, many wireless networks allow guest access to users; such clients may connect to the network for only a short period of time while the user is present at the location of the network.

In plot 920 in FIG. 9C, the ratio of successful days to failed days for wireless clients is shown. As shown, it can be seen that 16% of the clients never successfully connected to the wireless network on the days for which the clients attempted access.

In various embodiments, bad behavior throttler (BBT) 810 may cause the performance of one or more mitigation actions, when BCI 808 determines that a particular wireless client is a problematic outlier. In one embodiment, BBT 810 may send a custom message to an Identity Services Engine (ISE) or other network access control agent that specifies the problematic client(s). In a simple case, BBT 810 may include only the ID of a problematic client, such as the media access control (MAC) address of the client. In more complicated cases, BBT 810 may also include additional signaling in its message, such as information that can be used to throttle network access by the client for a certain time period. In turn, the ISE or other access control agent may forward the problematic MAC addresses on to one or more APs in the network, to begin blacklisting those APs. In other cases, BBT 810 may send the set of blacklisted MAC addresses on to the APs, directly. While blacklisted, onboarding requests from the client may be dropped by the AP/wireless network.

The set of APs that receive the blacklisted MAC may be selected, in some embodiments, based on the prior connection attempts made by the blacklisted client. For example, the ISE or other access control agent can intelligently select the APs by predicting the set of APs that the client is mostly likely to attempt a connection in the future. Note that there is limited memory on the APs, so it may not be possible to send all blacklisted clients to all the APs. However, simple geographic boundaries can be used along with predictive techniques to limit the set of blacklisted clients on the AP. In other cases, of course, the blacklisted MAC may be sent to all APs, if there are sufficient resources available.

By way of example of using a blacklist to throttle network access to a problematic client, assume that a client has been blacklisted for a predefined period of time and is subsequently flagged as problematic, again. In such a case, the amount of time that the client is blacklisted may increase each time (e.g., exponentially, geometrically, etc.). In some cases, the black listed status may also be communicated to the client by the AP (e.g., using 802.11 k/v extension by the AP), to notify the client that it has been blacklisted.

Figure 10:
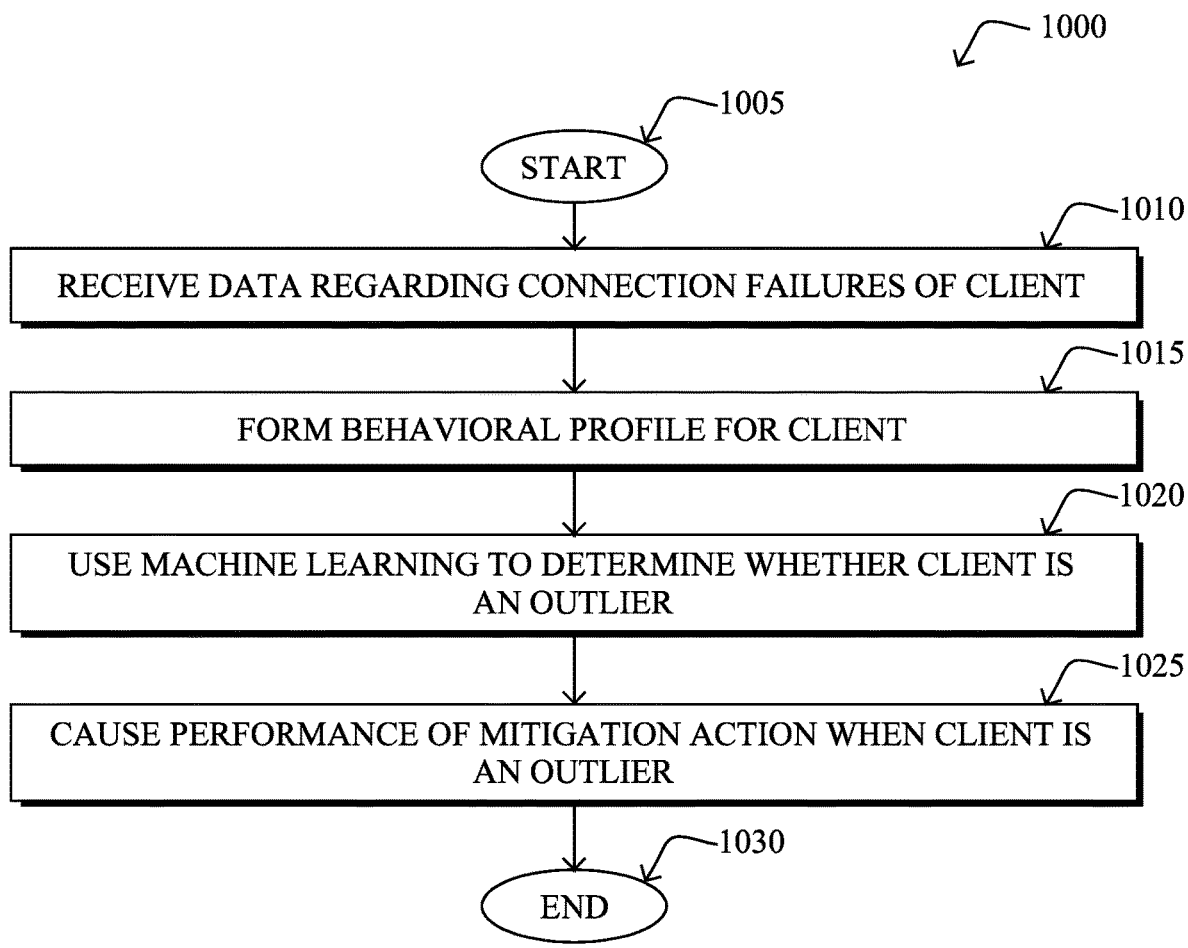
FIG. 10 illustrates an example simplified procedure for identifying problem clients in a wireless network using machine learning.

FIG. 10 illustrates an example simplified procedure for identifying problem clients in a wireless network using machine learning, in accordance with one or more embodiments described herein. For example, a non-generic, specifically configured device (e.g., device 200) may perform procedure 1000 by executing stored instructions (e.g., process 248), to provide a network assurance service to a monitored network. The procedure 1000 may start at step 1005, and continues to step 1010, where, as described in greater detail above, the network assurance service may receive data regarding connection failures of a wireless client of the wireless network. Such connection failures may include, for example, onboarding failures in which a client attempted to associate with an AP and connect to the wireless network, but could not. Other information that may be included in the received data could indicate when the failures occurred, when the client was successfully connected to the network, the APs to which the client attempted a connection, and/or any other information regarding the client connecting to the wireless network.

At step 1015, as detailed above, the network assurance service may form a behavioral profile for the wireless client based on the received data regarding the connection failures of the wireless client. Generally speaking, the behavioral profile for the client may quantify the successful and failed connections experienced by the client over time. For example, the behavioral profile may include information such as the connection failure rate of the client and/or its percentile compared to other clients, the number of days the client experienced at least one failure and/or its percentile compared to other clients, a contiguous failure ratio (e.g., the number of days the client successfully connected at least once, divided by the total number of days seen by the network), combinations thereof, the APs to which the client connected or attempted to connect, or any other statistics/behavioral metrics that can be used to quantify the failures and connections of the client. In some cases, these statistics/metrics may further be broken down by the APs to which the client attempted a connection.

At step 1020, the service may use machine learning to determine whether the behavioral profile of the wireless client is an outlier in relation to behavioral profiles of other wireless clients of the wireless network, as described in greater detail above. For example, if the client is in the $90^{th}$ percentile or greater for the distribution of connection failures, but the AP(s) to which the client attempted connections have failure percentiles lower than the $50^{th}$ percentile, this may indicate that the client is a problematic outlier. As would be appreciated, any number of thresholds may be employed, to make this determination (e.g., by comparing the percentiles to predefined thresholds, by comparing the difference in percentiles to a threshold, etc.). In some embodiments, the service can also use other criteria to exclude certain clients from consideration as outliers. For example, the service may not consider transient clients that are rarely seen by the network, clients that exhibit a 100% failure rate, clients that exhibit contiguous failures instead of intermittent, or the like.

At step 1025, as detailed above, the service may cause the performance of a mitigation action with respect to the wireless client, when the wireless client is determined to be an outlier. In some cases, the service may simply send out a notification indicating that the client is a problematic outlier (e.g., to a user interface, to an access control agent, etc.). In further embodiments, the mitigation action may entail blacklisting the client from accessing the network, either permanently or for a specified amount of time. For example, the service, or an intermediary, may send the MAC address of the client to one or more APs to be blacklisted. While blacklisted, onboarding requests from the client may be dropped by the receiving AP. The set of APs may be selected, in some cases, based on the prior access attempts by the client, so as to reduce the set of APs that receive the blacklist notification. In addition, in some embodiments, the amount of time that the client is blacklisted may increase for each subsequent blacklisting of the client. Procedure 1000 then ends at step 1030.

It should be noted that while certain steps within procedure 1000 may be optional as described above, the steps shown in FIG. 10 are merely examples for illustration, and certain other steps may be included or excluded as desired.

Further, while a particular order of the steps is shown, this ordering is merely illustrative, and any suitable arrangement of the steps may be utilized without departing from the scope of the embodiments herein.

The techniques described herein, therefore, allow for the identification of problematic clients that significantly contribute to the connection failures observed in a wireless network. In some aspects, mitigation actions can be taken with respect to the problematic clients, such as blacklisting the clients for a period of time, thereby preventing the clients from attaching to the network.

While there have been shown and described illustrative embodiments that provide for identifying and blacklisting problem clients in a wireless network, it is to be understood that various other adaptations and modifications may be made within the spirit and scope of the embodiments herein. For example, while certain embodiments are described herein with respect to using certain models for purposes of identifying outlier clients, the models are not limited as such and may be used for other functions, in other embodiments. In addition, while certain protocols are shown, such as Wi-Fi, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a network assurance service that monitors a wireless network, data regarding connection failures of a plurality of wireless clients configured to connect to the wireless network via one or more access points of the wireless network;
    forming, by the network assurance service, a behavioral profile for each of the wireless clients based on the received data regarding the connection failures of the wireless clients;
    using, by the network assurance service, machine learning to determine whether the behavioral profile of a particular wireless client of the wireless clients is an outlier in relation to the behavioral profiles of other wireless clients of the wireless clients; and
    causing, by the network assurance service, performance of a mitigation action with respect to the particular wireless client, when the particular wireless client is determined to be an outlier.

2. The method as in claim 1, wherein the mitigation action comprises blacklisting the particular wireless client from onboarding to the wireless network via the one or more access points of the wireless network.

3. The method as in claim 2, further comprising:
    blacklisting the particular wireless client for a period of time that is based on any prior blacklisting of the particular wireless client.

4. The method as in claim 2, further comprising:
    causing a media access control (MAC) address associated with the particular wireless client to be sent to the one or more access points via a blacklist request.

5. The method as in claim 1, wherein forming the behavioral profile of the particular wireless client comprises:
    determining a number of days the particular wireless client was seen by the wireless network;
    determining a number of access points of the wireless network to which the particular wireless client attempted to connect; and
    determining a connection failure rate for the particular wireless client.

6. The method as in claim 1, wherein forming the behavioral profile of the particular wireless client comprises:
    calculating a contiguous failure ratio for the particular wireless client as a ratio of days on which the particular wireless client successfully connected to the wireless network at least once to days the particular wireless client was seen by the wireless network.

7. The method as in claim 6, wherein using machine learning to determine whether the particular wireless client is an outlier comprises:
    classifying the particular wireless client as an outlier based in part on a determination that the contiguous failure ratio for the particular wireless client indicates that the connection failures of the particular wireless client are intermittent.

8. The method as in claim 1, wherein using machine learning to determine whether the particular wireless client is an outlier comprises:
    classifying the particular wireless client as an outlier based in part on a connection failure rate in the behavioral profile of the particular wireless client with respect a particular access point of the wireless network being statistically different from an overall connection failure rate for the particular access point by a threshold amount.

9. The method as in claim 1, wherein using machine learning to determine whether the particular wireless client is an outlier comprises:
    classifying the particular wireless client as an outlier based in part on a determination that the connection failures of the particular wireless client are associated with the particular wireless client attempting to access the wireless network using a secret key and not through web based authentication.

10. The method as in claim 1, wherein using machine learning to determine whether the particular wireless client is an outlier comprises:
    classifying the particular wireless client as an outlier based in part on a determination that the particular wireless client connected to a plurality of access points in the wireless network and did not favor a particular one of the plurality of access points by a threshold amount.

11. An apparatus, comprising:
    one or more network interfaces to communicate with a wireless network;
    a processor coupled to the network interfaces and configured to execute one or more processes; and
    a memory configured to store a process executable by the processor, the process when executed configured to:
        receive data regarding connection failures of a plurality of wireless clients configured to connect to the wireless network via one or more access points of the wireless network;

form a behavioral profile for each of the wireless clients based on the received data regarding the connection failures of the wireless clients;

use machine learning to determine whether the behavioral profile of a particular wireless client of the wireless clients is an outlier in relation to the behavioral profiles of other wireless clients of the wireless clients; and cause performance of a mitigation action with respect to the particular wireless client, when the particular wireless client is determined to be an outlier.

12. The apparatus as in claim 11, wherein the mitigation action comprises blacklisting the particular wireless client from onboarding to the wireless network via the one or more access points of the wireless network.

13. The apparatus as in claim 12, wherein the process when executed is further configured to:

blacklist the particular wireless client for a period of time that is based on any prior blacklisting of the particular wireless client; and cause a media access control (MAC) address associated with the wireless client to be sent to the one or more access points via a blacklist request.

14. The apparatus as in claim 11, wherein the apparatus forms the behavioral profile of the particular wireless client by:

determining a number of days the particular wireless client was seen by the wireless network;

determining a number of access points of the wireless network to which the particular wireless client attempted to connect; and determining a connection failure rate for the particular wireless client.

15. The apparatus as in claim 11, wherein forming the behavioral profile of the particular wireless client comprises:

calculating a contiguous failure ratio for the particular wireless client as a ratio of days on which the particular wireless client successfully connected to the wireless network at least once to days the particular wireless client was seen by the wireless network.

16. The apparatus as in claim 15, wherein the apparatus uses machine learning to determine whether the particular wireless client is an outlier by:

classifying the particular wireless client as an outlier based in part on a determination that the contiguous failure ratio for the particular wireless client indicates that the connection failures of the particular wireless client are intermittent.

17. The apparatus as in claim 11, wherein the apparatus uses machine learning to determine whether the particular wireless client is an outlier by:

classifying the particular wireless client as an outlier based in part on a connection failure rate in the behavioral profile of the particular wireless client with respect a particular access point of the wireless network being statistically different from an overall connection failure rate for the particular access point by a threshold amount.

18. The apparatus as in claim 11, wherein the apparatus uses machine learning to determine whether the particular wireless client is an outlier by:

classifying the particular wireless client as an outlier based in part on a determination that the connection failures of the particular wireless client are associated with the particular wireless client attempting to access the wireless network using a secret key and not through web based authentication.

19. The apparatus as in claim 15, wherein the apparatus uses machine learning to determine whether the particular wireless client is an outlier by:

classifying the particular wireless client as an outlier based in part on a determination that the particular wireless client connected to a plurality of access points in the wireless network and did not favor a particular one of the plurality of access points by a threshold amount.

20. A tangible, non-transitory, computer-readable medium storing program instructions that cause a network assurance service that monitors a wireless network to execute a process comprising:

receiving, at a network assurance service that monitors a wireless network, data regarding connection failures of a plurality of wireless clients configured to connect to the wireless network via one or more access points of the wireless network;

forming, by the network assurance service, a behavioral profile for each of the wireless clients based on the received data regarding the connection failures of the wireless clients;

using, by the network assurance service, machine learning to determine whether the behavioral profile of a particular wireless client of the wireless clients is an outlier in relation to the behavioral profiles of other wireless clients of the wireless clients; and causing, by the network assurance service, performance of a mitigation action with respect to the particular wireless client, when the particular wireless client is determined to be an outlier.

* * * * *

UNITED STATES PATENT AND TRADEMARK OFFICE
CERTIFICATE OF CORRECTION

Page 1 of 1

PATENT NO. : 10,841,314 B2
APPLICATION NO. : 15/947958
DATED : November 17, 2020
INVENTOR(S) : Vikram Kumaran et al.

It is certified that error appears in the above-identified patent and that said Letters Patent is hereby corrected as shown below:

In the Specification

Column 7, Line 50, should read:
AP1 through nth access point, APn) through which endpoint Column 7, Line 65, should read:
AP1 through nth access point APm) that provide connective- Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*